Figure 1:
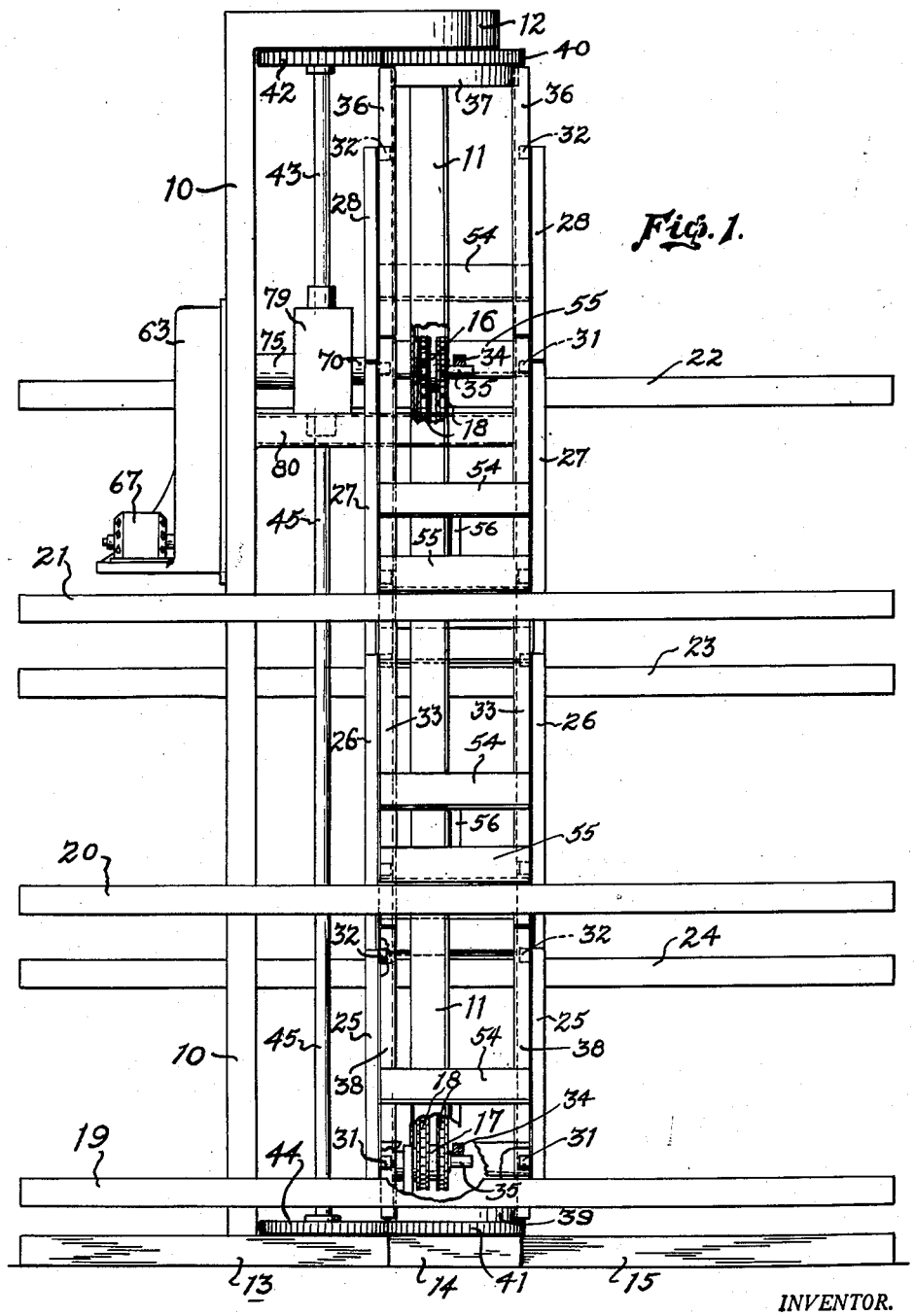

July 6, 1954    G. FRANCIS    2,682,958
AUTOMOBILE PARKING FACILITY
Filed May 5, 1952    6 Sheets-Sheet 1

INVENTOR.
GEOFFREY FRANCIS
BY
W. H. Atkinson
ATTORNEY

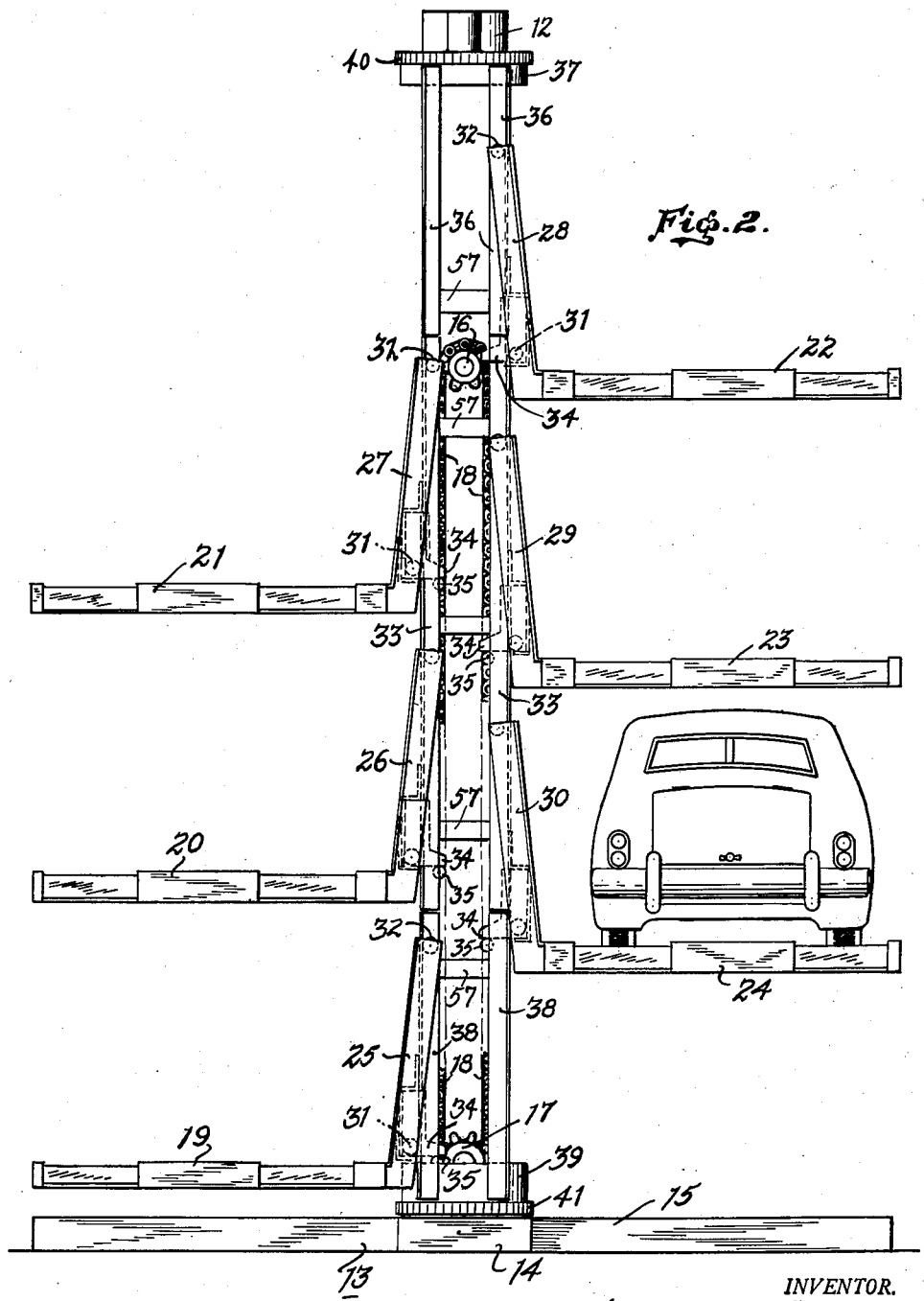

July 6, 1954            G. FRANCIS            2,682,958
AUTOMOBILE PARKING FACILITY
Filed May 5, 1952                          6 Sheets-Sheet 3
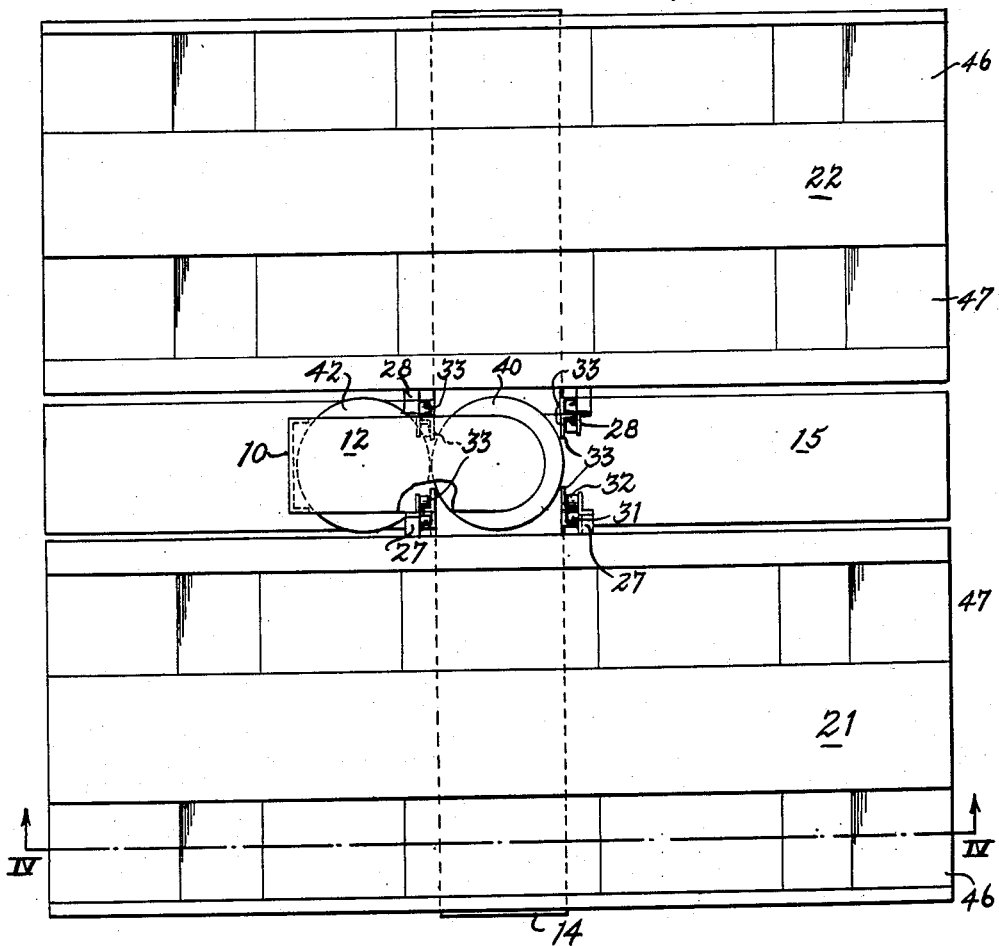
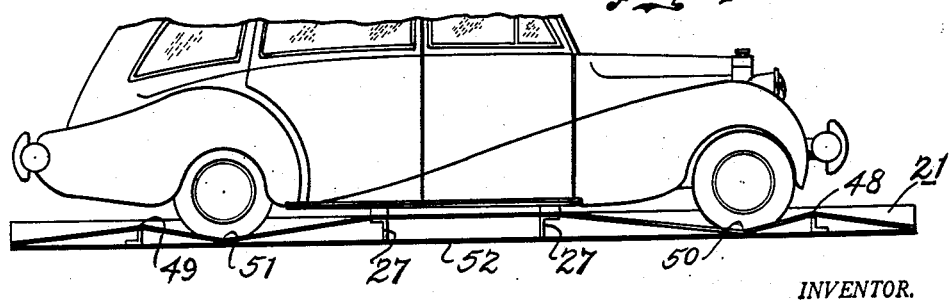
INVENTOR.
GEOFFREY FRANCIS
BY
ATTORNEY July 6, 1954 G. FRANCIS 2,682,958
AUTOMOBILE PARKING FACILITY
Filed May 5, 1952 6 Sheets-Sheet 4
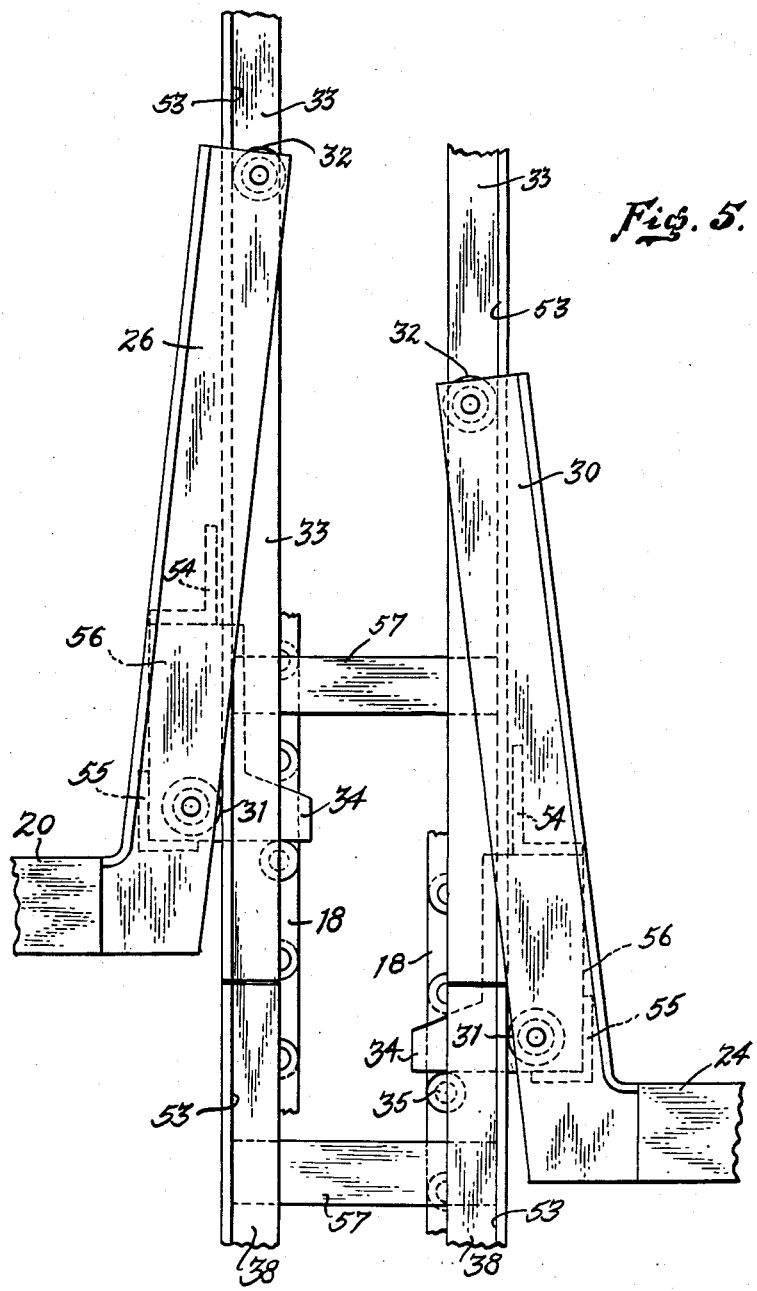
INVENTOR.
GEOFFREY FRANCIS.
BY
ATTORNEY.

July 6, 1954     G. FRANCIS     2,682,958
AUTOMOBILE PARKING FACILITY
Filed May 5, 1952     6 Sheets-Sheet 5
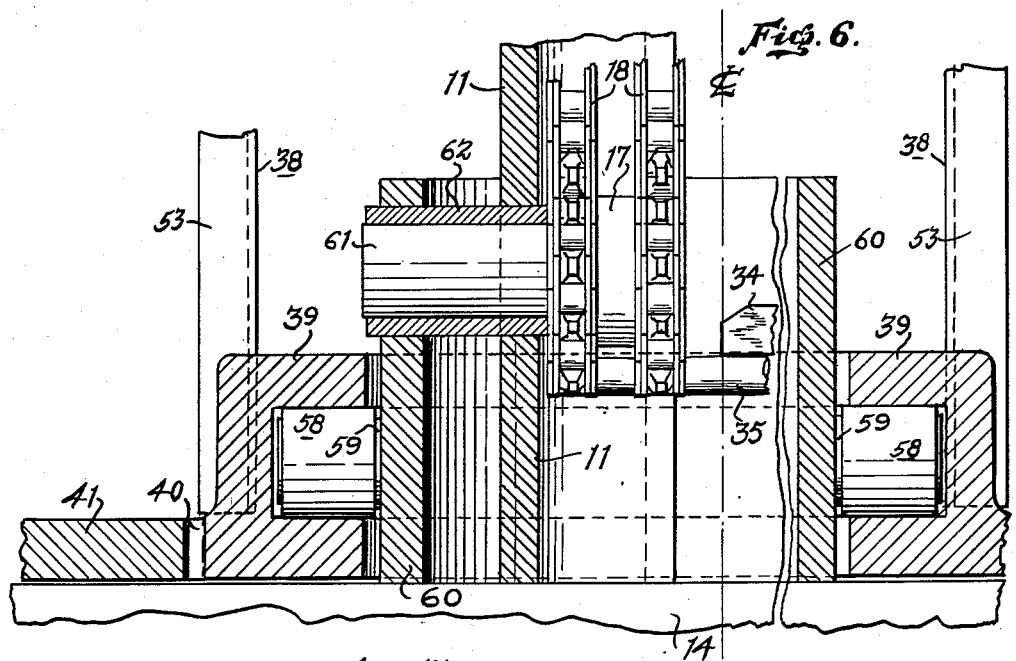
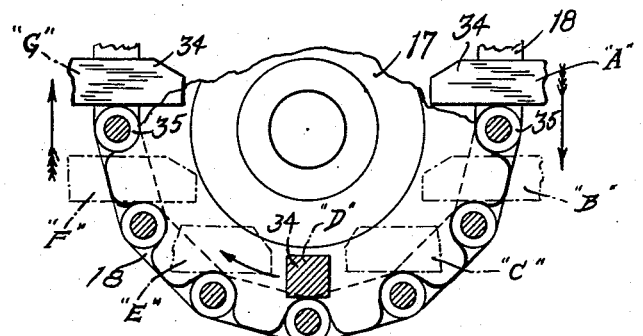
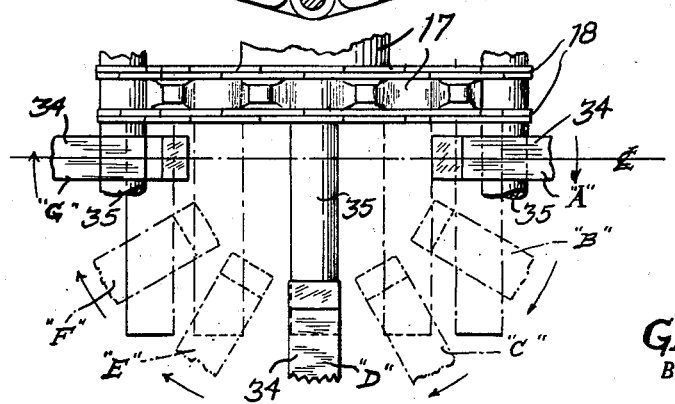
INVENTOR.
GEOFFREY FRANCIS.
BY
ATTORNEY July 6, 1954 G. FRANCIS 2,682,958
AUTOMOBILE PARKING FACILITY
Filed May 5, 1952 6 Sheets-Sheet 6
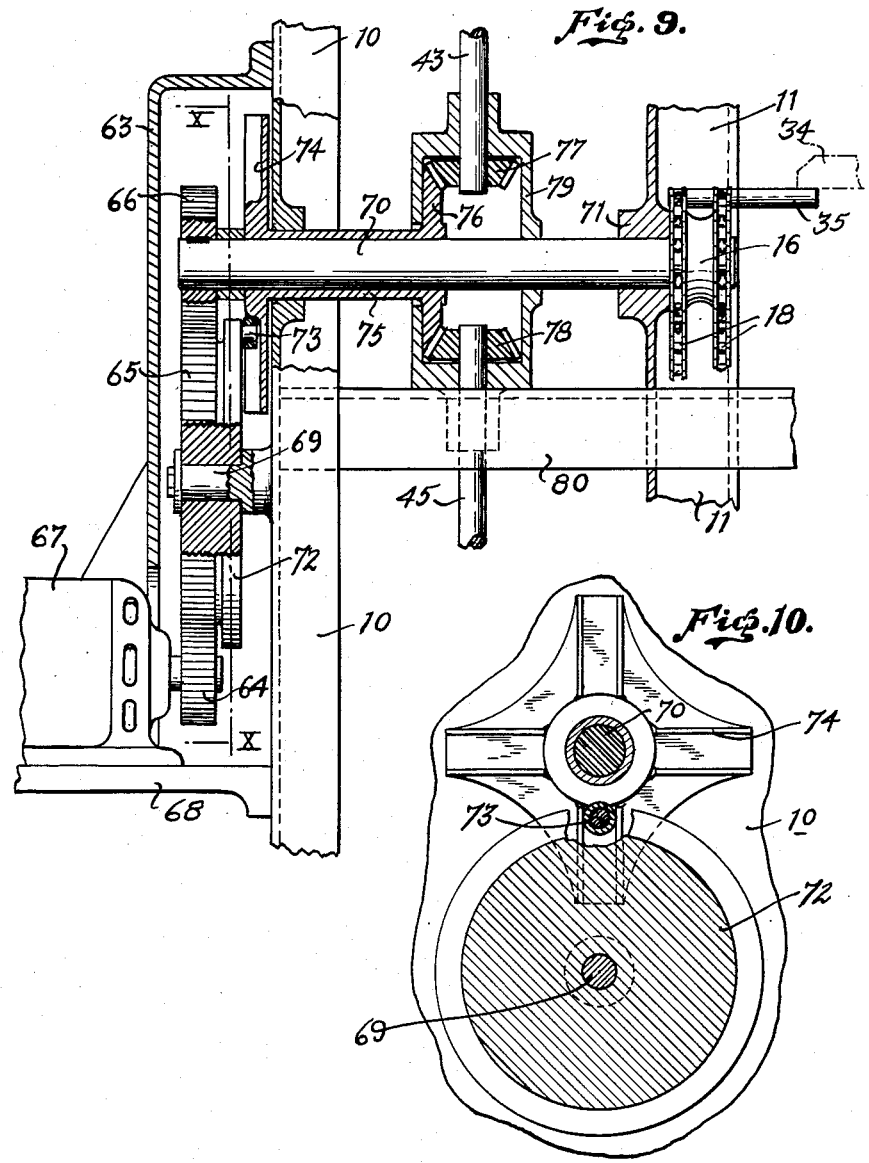
INVENTOR.
GEOFFREY FRANCIS
BY
Wm. H. Atkinson
ATTORNEY

Patented July 6, 1954

2,682,958

UNITED STATES PATENT OFFICE 2,682,958

AUTOMOBILE PARKING FACILITY

Geoffrey Francis, San Francisco, Calif.

Application May 5, 1952, Serial No. 286,221

11 Claims. (Cl. 214—16.1)

The present invention relates to an automobile parking facility and more particularly to a device of the type in which automobiles may be stored or parked in vertical tiers, thereby taking maximum advantage of available ground space in congested areas.

An object of my invention is to provide an automobile parking device by which a plurality of automobiles can be conveniently handled and parked with a minimum of ground space requirement.

Another object of the invention is to provide a parking facility having a plurality of flights or lifts upon each of which an automobile may be parked and maneuvered up and down with respect to a single elevator drive mechanism.

A further object of the invention is to provide a columnar type of automobile storing and parking device in which parked automobiles may be arranged upon flights or lifts in an ascending manner at one side of supporting column and turned about at the upper end of the column, then lowered downwardly along the other side of said column for discharge therefrom.

Another object of the invention is to provide a novel type of drive for an automobile parking device of the character described in which the vertical and transitional movements of the automobile supporting lifts or flights are synchronized and driven by a single common source of power.

Another object of the invention is to provide a novel type of drive for an automobile parking device of the character described in which the vertical and transitional movements of the automobile supporting lifts or flights operate in timed relation and are driven by a common source of power.

Another object of the invention is to provide a columnar type of automobile parking device having a novel arrangement of turnable trackways at both its base and upper end which will permit a transfer of automobile supporting flights or lifts from one side of the supporting column to the other side thereof and wherein a single elevating mechanism is employed for controlling the position and movements of said flights or lifts in both their ascending and descending movements and in their turning movement with respect to the supporting column.

Other objects and advantages will be in part evident to those skilled in the art and in part pointed out hereinafter in connection with the accompanying drawings wherein there is shown by way of illustration and not of limitation a preferred embodiment of the invention.

In the drawings:

Figure 1 is a vertical side view of my improved device with parts broken away to reveal details of construction, Figure 2 is a front view of the device shown in Fig. 1, Figure 3 is a plan view of the device as illustrated in Figs. 1 and 2, Figure 4 is a fragmentary sectional view taken in section along lines IV—IV and looking in direction of arrows, showing an automobile positioned thereupon, Figure 5 is an enlarged fragmentary view showing other details of construction, Figure 6 is a fragmentary view showing details of the driving mechanism, Figures 7 and 8 are fragmentary diagrammatic views illustrating a novel feature of the driving mechanism, Figure 9 is a fragmentary sectional view of the drive and the synchronizing power take-off means employed for imparting a transitional or turning movement to the automobile supporting flights or lifts at the base and top of the supporting column, and Figure 10 is a view taken along lines X—X of Figure 9 showing the details thereof.

Upon referring particularly to Figures 1, 2 and 3 of the drawings it will be seen that my improved parking device is of the type upon which a plurality of automobiles can be parked in tiers one above the other over a ground area slightly greater than that which would be required for parking two automobiles side by side on the surface of a parking lot. In the embodiment here shown the device is adapted to accommodate six individual automobiles but it is to be understood the device may be extended vertically to any reasonable height in order to accommodate eight, ten or more automobiles arranged in double tiers without departing from the spirit of the invention.

In brief outline and as shown in these figures of the drawings the invention comprises columnar type of support composed of two main supporting frame members 10 and 11 that are spaced with respect to each other. These frame members 10 and 11 are connected at their top by a head portion 12 which extend from the frame member 10 over and above the frame member 11. At their lower ends the frame members 10 and 11 are secured to a base portion 13 which may be of any suitable configuration. In the drawings the base portion 13 is shown in the form of two right angled frame forming members 14 and 15 that are disposed at right angles to each other and extend outwardly a distance sufficient to form a firm foundation for the columnar forming frame members 10 and 11. The frame member 11 is of channel like configuration in cross section and mounted upon its channeled side there are two double sprockets 16 and 17 that carry a sprocket chain 18 which, as will hereinafter appear, operate as a means for elevating a plurality of automobile supporting platforms or lifts 19 to 24 inclusive.

As more clearly shown in Figure 2 of the drawings, the automobile supporting platforms or lifts 19 to 24 are of a cantilever type. These lifts are each carried by two spaced upwardly and angularly extending struts or bracket arms, designated respectively by the numerals 25 to 30. As will be pointed out in more detail hereinafter, these struts or bracket arms 25 to 30 are provided with anti-friction or roller means 31 and 32 which engage with vertically extending rails or guides 33 disposed in pairs forming vertical trackways at opposite sides of the column forming members 10 and 11. In addition to the rollers 31 and 32 each of the struts or bracket arms 25 to 30 also support an extending dog or abutment 34 which projects inwardly to a point where they will engage with extending pintles or dog engaging arms 35 that are arranged in spaced relation along the length of the sprocket chains 18. In this manner, as shown in Fig. 2, the sprocket chains 18 will operate to move the flights or lift platforms 19, 20 and 21 upwardly along the spaced rails 33 at one side of the column formed by the frame members 10 and 11 while the flights or lift platforms 22, 23 and 24 will move downwardly along the spaced rails 33 at the other side of the column.

A novel feature of the invention resides in the provision of extensions of the track ways formed by the rails 33. One of these extensions located at the upper end of the rails 33 is formed by similar rails 36 which are carried by and depend from a bull ring 37. This bull ring 37 is journaled upon the head portion 12 and the rails 36 are disposed in alignment with the rails 33. When the rails 36 are in the position illustrated it will be seen that the uppermost of the flights or lift platforms will be supported thereby while the dog or abutment 34 is maintained in contact with the pintle or dog engaging arm 35 upon the sprocket chains 18 as it passes over the sprocket 16. At the base of the column formed by the members 10 and 11 there is a similar arrangement of spaced rails 38 that provide an extension at the lower end of the track ways formed by the rails 33. These spaced rails 38 are carried by a second bull ring 39 which is journaled upon the base formed by the members 14 and 15.

By now referring back to Figure 1 of the drawings it will be seen that the bull rings 37 and 39 are each provided with teeth about their periphery which form gears 40 and 41. The gear 40 carried by the bull ring 37 is shown as driven by gear 42 carried by a shaft 43 which is adapted to be driven in an intermittent manner or in timed relation with the sprocket chains 18. In this manner, when one or the other of the lifts 19 to 24 are moved upwardly and into full support by the downwardly extending spaced rails 36 carried by the bull ring 37 it may be moved, as will hereinafter appear, from one to the other side of the column. In like manner the gear 41 is shown as adapted to be driven by a gear 44 carried by a shaft 45 which is also arranged and adapted to be operated in an intermittent manner in synchronized relation with movements of the platforms or flights 19 to 24 when they reach their lowermost position and in full engagement with the upwardly extending spaced rails 38 carried by the bull ring 39.

As more clearly shown in Figure 3 of the drawing, the lift platforms or flights 19 to 24 inclusive are of rectangular outline and have a total horizontal area slightly larger than the overall dimensions of the largest automobile which might be placed thereupon. As a means for positioning an automobile substantially centrally thereupon and preventing any possibility of an automobile rolling therefrom without set brakes, the lift platforms or flights 19 to 24 each have spaced runways 46 and 47 with a waved or uneven tread surface. Such a surface is provided by elevated transversely extending ridges 48 and 49 adjacent the ends of the platform and depressed portions or valleys 50 and 51 that are positioned at points which will correspond with the spacings of wheels of the average automobile. With this arrangement it will be seen that where the valleys 50 and 51 do not correspond exactly with the spacing of wheels of an automobile at least one of the sets of wheels will settle in one of the valleys 50 or 51. Another feature of these flights or lift platforms is the provision of an under plate 52 which acts as a canopy to prevent grease or oil dripping from one automobile to another when parked upon one of the lift platforms or flights 19 to 24.

In Figure 5 of the drawings there is shown in more detail how the platforms or flights 19 to 24 inclusive are supported for movement along the rails 33 and the extensions 36 and 38 by the sprocket chain 18. As here shown the spaced rails 33 and the extensions 36 and 38 are formed of angle iron and are disposed so that one of the flanges thereof, designated by the numeral 53, extends outwardly and in alignment to provide continuous and oppositely exposed surfaces along which the anti-friction means or rollers 31 and 32 will move. The rollers 31 are mounted at the lower ends of the platform securing brackets 25—30 and the rollers 32 are shown as mounted at the upper end of these brackets. In this way the rollers 31 function as a fulcrum over which the projecting platform or flights 19—24 are supported in cantilever fashion by the rollers 32, at the upper end of the brackets 25—30, which engage with the inner surface of the flanges 53 of the rails 33, 36 and 38. It will be understood that these platform supporting brackets may be constructed in a number of different ways. In the drawing the brackets 25—30 are shown as composed of two spaced upwardly and angularly inclined members that are secured together in spaced relation by transversely extending angle irons 54 and 55 which are preferably welded in place. The dogs or abutments 34 carried by these brackets are formed by an extension upon vertically disposed plate members 56 that are positioned between and welded to the angle irons 54 and 55. The spaced rails 33, 36 and 38 are also secured in spaced parallel relation by means of tie plates 57 that extend horizontally therebetween.

By now referring to Figure 6 of the drawings it will be seen that the bull ring 39 at the base of the supporting column, is journaled or supported for rotation upon a plurality of radially disposed rollers 58 that are mounted upon stub shafts 59 carried by an annular or ring supporting member 60 which is secured to the base formed by the right angle members 14 and 15.

It will be noted here that the vertically extending frame member 11 is disposed at one side of the center of the annular or ring like member 60 and serves with the latter member as a support for a horizontally extending stub shaft 61 that carries the lower double sprocket 17 about which the double sprocket chain 18 passes. In this instance, a bushing 62 provides a bearing for the stub shaft 61. At the left of this view there is shown the manner in which the gear 41 operates with the gear teeth 40 carried by the bull ring 39. The frame forming member 11, referred to above, as disposed at one side of the center of the annular column or supporting ring 60, carries the sprockets 16 and 17 in such a position that the extending pintles or abutment engaging dogs 35 carried by the chain 18 will extend over and/or through a vertical plane extending at a right angle to the plane of the trackways formed by the spaced rails 33, 36 and 38. In this figure of the drawing the abutment or dog engaging pintle 35 is broken away and the dog or abutment 34 with which the pintle 35 engages is only partially shown to illustrate the relative positions of these parts when the associated platform or lift 19—24 is in its lowermost position and midway its transitional movement between the descending and the ascending side of the supporting column formed by the members 10 and 11. The novelty of this arrangement is that the extending pintle or abutment engaging dog 35 carried by the chain is always in a position where it will be engaged by the dog or abutment 34 carried by the platform securing brackets 25—30 as these brackets, together with the platforms 19—24, are moved from one side of the column or support to the other at the ends of their paths of vertical travel.

Figures 7 and 8 of the drawings diagrammatically illustrate the above described feature. While these illustrations are limited to conditions at the lower sprocket 17 with the lowermost platform or lift supported by the spaced rails 38, it will be understood that a corresponding action will take place at the upper sprocket 16 when a bracket with its supported platform reaches its uppermost point of travel and into full support by the spaced rails 36 carried by the bull ring 37. In these figures the sprocket chain 18 is shown with its dog engaging pintle 35 and the dog or abutment 34 in the different relative positions which these members will assume in their movement about the sprocket 17. By comparing the positions of the abutments 34 with respect to the pintle 35, as illustrated in Figure 8, it will be noted that the dogs 34 of the respective platforms will remain in overlapping relation with a supporting pintle 35 at all times during its travel from one to the other side of the sprocket 17. In this showing when the abutment or dog 34 is in position "A," the particular platform supported thereby will be in its descending movement. This engagement will then continue during this final downward movement through the positions "B" and "C." When the platform or lift has reached its lowermost position the dog or abutment 34 will be in substantial alignment with the axis of the pintle 35. As shown the length of the pintle 35 is such that it will extend over the center line of the column and will therefore continue as a support for the dog or abutment 34 carried by the bracket while the supported platform continues in its transitional clock-wise movement. From this point the dog or abutment carried by the bracket will move in an upwardly direction through the positions "E," "F" and "G," where in this latter position the platform will be in alignment for upward vertical travel along the rails 33 at the other side of the supporting column.

The reason for the employment of the double sprockets 17 and 18 together with two similar sprocket chains 18 which operate in unison will now be apparent. It will be evident that a single sprocket chain 18 would be incapable of supporting the extending pintle 35 in such manner as to carry the weight of a platform in the manner explained. The employment of two spaced sprocket chains upon the double sprockets 17 and 18 is a requirement in order to obtain the supporting function performed by the pintle 35 as the platforms are moved from one side of the column to the other at the upper and lower ends of the platform supporting column. Therefore, where reference is made to the sprocket chain 18 it will be understood that the double chain arrangement as here shown is intended. It is however conceivable that a link belt type of chain having sufficient width might be substituted if conditions should warrant such a change.

Reference is now made to Figures 9 and 10 of the drawings for a description of the drive provided for the sprocket chains 18 and the rotary or transitional movement of the trackway extensions formed by the rails 36 and 38 respectively at the top and bottom of the platform supporting column. As here shown the supporting member 10 carries a gear housing 63 within which there is enclosed a set of gears 64, 65 and 66 that are disposed and suitably supported in vertical alignment by the frame member 10. The gear 64 is arranged to be driven by an electric motor 67 mounted upon a bracket 68 that is a part of the housing 63. The intermediate gear 65 is mounted upon a stub shaft 69 and the gear 66 is keyed upon a horizontally extending shaft 70 which carries the upper double sprocket 16. At this end the shaft 70 is journaled in a bearing 71 carried by the frame member 11. As here shown the intermediate gear 65 has a plate-like or disc portion 72 which carries a projecting pin and roller assembly 73 that serves together with a Geneva gear member 74 to provide an intermediate drive which, as will hereinafter appear, serves to impart transitional movement to the bull rings 37 and 39 at the top and bottom of the platform or flight supporting column. The Geneva gear member 74 has four radial guideways with which the pin and roller assembly 73 is adapted to cooperate and in this manner the Geneva member 74 will be turned one quarter of a revolution upon each full and complete revolution of the disc portion 72 of the intermediate gear 65. In this arrangement the Geneva gear member 74 is shown as formed upon a sleeve 75 which carries a beveled gear 76 at its other end. This beveled gear serves to drive two oppositely disposed and small spur gears 77 and 78 that are respectively keyed to the vertically extending shafts 43 and 45 upon which the bull ring driving gears 42 and 44 are mounted. The beveled spur gears 77 and 78 and the shafts 43 and 45 are here shown as journaled within a gear housing 79 which is supported upon a horizontal platform 80. With the various driving alignments in the positions shown, the pin and roller assembly 17 being on dead center, the dog or abutment pintle 35 will be in its uppermost position at the top of the sprocket 16 and as shown in Figure 8 of the drawings the dog or abutment 34 carried by the platform supporting bracket will be in substantial alignment with the pintle 35. At this time the transitional movement of the bull ring and the extending rails 36 will be midway between their limits of transitional movement from one to the other side of the column.

It is believed that the operation of my improved parking facility will be understood from the above, but by way of over all consideration, and with reference to Figure 2 of the drawings, it may be explained that after an automobile has been driven upon the platform 19, with the electric motor 67 de-energized, the platform 22 at the top of the column will have moved around the sprocket 16 to a point where its rollers 31 will engage with the upper ends of the rails 33. At this time the platform 19 will be fully supported by two of the upwardly extending rails 38 carried by the bull ring 39. Now when the motor 67 is energized the sprockets 16 and 17 will turn in a clock-wise direction and thus cause the chain to move and carry the platforms 19, 20 and 21 upwardly along one side of the column while the platforms 22, 23 and 24 will descend along the other side of the column. When the platform 21 which is next in line reaches its uppermost point of travel, the Geneva gear drive will come into operation and cause the bull ring 37 to rotate through an angle of 180° and thus move the platform 21 over and into the position where the platform 22 is now shown. At the same time, as the platform 24 reaches its lower limit of travel the Geneva gear driving mechanism will also operate to carry this platform 24 around the column and into the position where the platform 19 is now located. In this manner it will be seen that the platforms will be moved in a substantially continuous manner up one side of the column formed by the members 10 and 11 and downwardly along the other side thereof. When an automobile is being placed upon the platforms the motor 67 will be stopped to permit this loading and/or unloading as the platforms reach the bottom of the column. The unloading may take place when the platforms have reached the lower limit of their downward movement at the descending side of the column or at the point where the platforms at the other side of the column are in a position to assume their upward travel. It is contemplated that the electric motor will be provided with an automatic electrical control circuit with various limit switches and/or other automatic relays by which the movements of the platforms may be controlled in an entirely automatic manner.

While I have, for the sake of clearness and in order to disclose the invention so that the same can be readily understood, described and illustrated specific devices and arrangements, I desire to have it understood that this invention is not limited to the specific means disclosed, but may be embodied in other forms that will suggest themselves to persons skilled in the art. It is believed that this invention is new and all such changes as come within the scope of the appended claims are to be considered as part of this invention.

What I claim is:

1. In an automobile parking facility, the combination of a vertically disposed supporting column, a platform elevating mechanism carried by said column, a plurality of vertically extending rails disposed in pairs and forming open ended vertical trackways at opposite sides of said column, a plurality of platforms for an automobile or the like adapted and arranged to move vertically along said trackways, rotatable means at the top and base of said column having coextending trackways for said platforms when moved beyond the open end of the vertical trackway at one side to the open end of the trackway at the other side of said column, and means carried by said platforms engaging said elevating mechanism and forming a support for said platforms during movement along each of said vertical trackways and when engaging the extending trackways of said rotatable means during the transitional movement of said platforms by said rotatable means from a trackway at one side of said column to the trackway at the other side thereof.

2. In an automobile parking facility, the combination of a vertically disposed supporting column, a platform elevating mechanism carried by said column, a plurality of vertically extending rails disposed in pairs and forming open ended vertical trackways at opposite sides of said column, a plurality of platforms having antifriction means adapted and arranged to be moved vertically along and beyond the open ends of said trackways by said elevating mechanism, rotatable means at the top of said column having coextending trackways for said platforms when moved one at a time from the open end of a trackway at one side of said column, means for intermittently rotating the rotatable means at the top of said column to bring the coextending trackways thereof alternating into alignment with the fixed open ended vertical trackways at opposite sides of said column, and means operatively connecting said platforms with said elevating mechanism while moving along each of said open ended vertical trackways and supporting said platforms upon said co-extending trackways during the transfer of said platforms from one to the other of said trackways.

3. In an automobile parking facility, the combination of a vertically disposed supporting column, a platform elevating mechanism carried by said column, a trackway extending vertically along opposite sides of said column, a plurality of platforms having means engaging said vertical trackways adapted and arranged to be moved vertically along said trackways by said platform elevating mechanism, means at the top of said column forming a rotatable trackway support for transferring said platform from the trackway at one side of said column to the trackway at the opposite side thereof, and means carried by said platforms engaging said elevating mechanism forming a support for said platform while moving along each of said vertical trackways and during the rotative movement of said trackway support in the transfer of said platforms from one to the other of said trackways.

4. In an automobile parking device, the combination of a vertically disposed supporting column, a horizontally disposed bull-ring at the upper end of said column turnable about a vertical axis, a second bull-ring rotatably mounted at the base of said column in axial alignment with said first bull-ring, pairs of spaced rails forming fixed vertical trackways along opposite sides of and intermediate the ends of said column, pairs of similar spaced rails forming movable trackways extending downwardly from said first bull-ring and normally in alignment with said fixed trackways of the column, similar pairs of spaced rails forming trackways carried by said second bull-ring extending upwardly in alignment with the rails forming the fixed trackways of said column, a plurality of lift platforms arranged and adapted to move vertically along said trackways, an elevating mechanism adapted to engage and move said lift platforms upwardly along one side of said column and downwardly along the other side of said column, a source of motive power, means forming a direct driving connection between said elevating mechanism and said source of motive power, and means forming an intermittently operating driving connection between said source of motive power and said bull-rings, whereby said platforms will be moved along said fixed and extending trackways in spaced relation and transferred one at a time from one to the other of said trackways as said platforms are moved by said elevating mechanism into cooperating relation upon one or the other of the extending trackways carried by said rotatable bull-rings at the top and bottom of said column.

5. In an automobile parking device, the combination of a vertically disposed supporting column, a horizontally disposed bull-ring at the upper end of said column turnable about a vertical axis, a second bull-ring rotatably mounted at the base of said column in axial alignment with said first bull-ring, pairs of spaced rails forming fixed vertical trackways along opposite sides of and intermediate the ends of said column, pairs of similar spaced rails forming movable trackways co-extending with said fixed trackways carried by and extending downwardly from said first bull-ring, similar pairs of spaced rails forming trackways carried by said second bull-ring and extending upwardly in alignment with the rails forming the fixed trackways carried by said column, a plurality of lift platforms arranged and adapted to move in vertically spaced relation along said trackways, an elevating mechanism carried by said column adapted to engage and move said lift platforms upwardly along one side and downwardly along the other side of said column, a source of motive power, direct driving means connection between said elevated mechanism and said source of motive power, and means forming an intermittently operating driving connection between said source of motive power and each of said bull-rings, whereby said platforms will be moved in spaced relation along said fixed trackways and transferred one at a time from one to the other of said trackways as said platforms are moved by said elevating mechanism into cooperating relation with one or the other of the extending trackways carried by said rotatable bull-rings at the tops and bottom of said column.

6. In an automobile parking device, the combination of a vertically disposed supporting column, a horizontally disposed bull-ring at the upper end of said column turnable about a vertical axis, a second bull-ring rotatably mounted to move about the base of said column in axial alignment with said first bull-ring, pairs of spaced rails forming fixed vertical trackways along opposite sides of and intermediate the ends of said column, pairs of similar spaced rails forming movable trackways that normally align with the fixed trackways extending downwardly from said first bull-ring at the upper end of the column, similar pairs of spaced rails forming trackways carried by said second bull-ring extending upwardly and normally in alignment with the rails forming the fixed trackways carried by said column, a plurality of lift platforms adapted and arranged to move vertically upward along one and downwardly along the other of said trackways, a sprocket chain carried by said column for moving said lift platforms in spaced relation upwardly along one side of said column and downwardly along the other side of said column, a source of motive power, means forming a direct driving connection between said sprocket chain and said source of motive power, and a Geneva gear forming an intermittent driving connection between said source of motive power and said bull-rings, whereby said platforms will be moved in spaced relation along said fixed trackways and transferred one at a time from one to the other of said fixed trackways as said platforms are moved by said sprocket chain from the fixed vertical trackways of said column to the extending trackways carried by said rotatable bull-rings.

7. In an automobile parking facility of the character described, the combination of a columnar support having spaced parallel trackways extending vertically along opposite sides thereof, a plurality of automobile supporting platforms mounted for travel in spaced relation upwardly along the trackway at one side of said column and downwardly along the trackway at the other side of said column, an operating mechanism mounted between said spaced trackways having means engaging said platforms for controlling their travel along said trackways, a rotatable support at the upper end of said column, spaced trackways carried by said support and extending downwardly and normally in alignment with said first spaced parallel trackways, said operating mechanism being adapted and arranged to move said platforms upwardly along one side of said column and into a position of support by the downwardly extending trackway carried by said support, and an intermittent power transmitting connection between said operating mechanism and said support for turning said support when a platform has been positioned upon one of its trackways by said operating mechanism to thus align said trackway with the trackway at the other side of said column.

8. In an automobile parking facility of the character described, the combination of a columnar support having spaced parallel trackways extending vertically along opposite sides thereof, a plurality of automobile supporting platforms mounted for travel in spaced relation upwardly along the trackway at one side of said column, an operating mechanism mounted between said spaced trackways having means engaging said platforms for controlling their travel along said trackways, a rotatable bull-ring at the upper end of said column, spaced trackways supported by said bull-ring and extending downwardly and normally in alignment with said first spaced parallel trackways, said operating mechanism being adapted and arranged to move said platforms upwardly along one side of said column and into a position of support by a downwardly extending trackway carried by said bull-ring, and an intermittent power transmitting connection between said operating mechanism and said bull-ring for turning said bull ring when a platform has been positioned upon one of its trackways by said operating mechanism and thus align said downwardly extending trackway with the trackway at the other side of said column.

9. In an automobile parking facility of the character described, the combination of a columnar support having fixed vertical trackways extending along opposite sides thereof, a plurality of automobile supporting platforms mounted to travel upwardly along the trackway at one side of said column and downwardly along the trackway at the other side of said column, a sprocket chain drive mounted between said fixed trackways, means carried by said sprocket chain for positioning and moving said platforms in spaced relation along said fixed trackways, a rotatable bull-ring at the upper end of said column, a pair of spaced trackways supported by said bull-ring extending downwardly and normally in alignment with said fixed vertical trackways, means for driving said sprocket chain continuously in one direction, whereby said platforms will be moved upwardly along said column and into a position of support by one of the downwardly extending trackways carried by said bull-ring, and an intermittent driving connection between said sprocket chain drive and said bull-ring operating when a platform has been positioned and held by the means carried by said sprocket chain upon one of its trackways to turn said bull-ring and align the platform carrying trackway thereof with the fixed trackway at the other side of said column.

10. In an automobile parking facility of the character described, a columnar support having fixed trackways extending vertically along opposite sides thereof, a plurality of load supporting platforms mounted for travel in spaced relation upwardly along the trackway at one side of said column and downwardly along the trackway at the other side of said column, a sprocket chain drive mounted between said spaced trackways, means forming a driving connection between said sprocket chain and said platforms, a rotatable bull-ring journaled at the upper end of said column, a pair of depending trackways carried by said bull-ring normally in alignment with said fixed trackways, means for driving said sprocket chain continuously in one direction and moving said platforms upwardly along a fixed trackway of said column and into a position of support by one of the depending trackways carried by said bull-ring, and a Geneva movement driving connection between said sprocket chain drive and said bull-ring for periodically turning said bull-ring when a platform is positioned upon one of its depending trackways and moving said depending trackway into alignment with the fixed trackway at the other side of said column while said platform is held in cooperating relation upon said depending trackway by the means forming a driving connection between said platform and the sprocket chain.

11. A drive for an automobile parking facility of the character described having vertically arranged and oppositely disposed trackways upon which automobile supporting platforms ascend and descend along opposite sides of a column and having a co-extending turnable trackway at the top and base of said column for transferring said platforms one at a time from one to the other side of said column, comprising a source of motive power, an elevating mechanism for controlling the movements of said platforms along the said trackways in both their ascending and descending travel, means forming a direct driving connection between said source of motive power and said elevating mechanism, a rotatable support for the co-extending turnable trackway at the top and base of said column, and means forming an intermittent driving connection between said source of motive power and said rotatable supports whereby said platforms will be successively moved while supported by said elevating mechanism from the ascending trackway to the descending trackway of said column and vice versa in a continuous manner.

References Cited in the file of this patent

UNITED STATES PATENTS

| Number | Name | Date |
|---|---|---|
| 1,458,881 | Gromer | June 12, 1923 |
| 1,781,806 | Da Costa | Nov. 18, 1930 |
| 1,815,738 | MacDonald | July 21, 1931 |
| 1,932,446 | Cain, Sr. | Oct. 31, 1933 |